United States Patent [19]

Vaughan

[11] 4,046,868

[45] Sept. 6, 1977

[54] PRODUCTION OF HYDROGEN PEROXIDE

[75] Inventor: Lawrence G. Vaughan, Wilmington, Del.

[73] Assignee: E. I. Du Pont de Nemours and Company, Wilmington, Del.

[21] Appl. No.: 401,070

[22] Filed: Sept. 26, 1973

[51] Int. Cl.$^2$ ............................................. C01B 15/02
[52] U.S. Cl. .................................................... 423/588
[58] Field of Search .................... 423/588, 589, 590; 260/369, 551 R, 562 R

[56] References Cited

U.S. PATENT DOCUMENTS

| | | | |
|---|---|---|---|
| 2,660,580 | 11/1953 | Von | 260/369 |
| 2,793,211 | 5/1957 | Lo Cicero et al. | 260/562 R |
| 2,820,801 | 1/1958 | Benneville et al. | 260/562 R |
| 3,780,168 | 12/1973 | Kabisch et al. | 423/588 |

*Primary Examiner*—O. R. Vertiz
*Assistant Examiner*—Wayne A. Langel

[57] ABSTRACT

An improved process for the production of hydrogen peroxide is provided in which an (N,N-dialkyl) carboxylic acid amide having a solubility in water of less than 1 percent at 25° C. is used as a solvent in the anthraquinone process.

10 Claims, No Drawings

PRODUCTION OF HYDROGEN PEROXIDE

BACKGROUND OF THE INVENTION

The production of hydrogen peroxide by the anthraquinone process is well known. In such processes, an alkylated anthraquinone is hydrogenated in a solvent in the presence of a catalyst to the corresponding anthrahydroquinone which, after separation of the catalyst, is oxidized by means of oxygen to produce hydrogen peroxide. The anthraquinone is regenerated during the oxidation and is recycled to the hydrogenation stage after first removing the product hydrogen peroxide, for example, by extraction with water. In such processes, one mol of hydrogen peroxide is obtained for each mol of the anthrahydroquinone present in solution. It is therefore important that the starting anthraquinone and the corresponding anthrahydroquinone be highly soluble in the solvent or solvents that are employed.

The solvents used in the anthraquinone process have most advantageously been two component systems in which one solvent, usually a hydrocarbon type, is present primarily to dissolve the quinone and the other, a polar solvent, is present to dissolve the hydroquinone. Since polar solvents tend to be relatively soluble in water, contamination of the aqueous hydrogen peroxide extract may become a problem if the polar solvent is not used sparingly. Nevertheless, sufficient polar solvent must be used to permit a high concentration of the hydroquinone to be present in the organic phase. The maintenance of a proper balance between these two criticalities is essential in peroxide manufacture.

German Offenlegungsschrift 2,065,155 published on Nov. 2, 1972 discloses the use of N,N-diethyl-N',N'-dibutyl urea as a hydroquinone and quinone solvent and German Offenlegungsschrift 2,018,686 discloses the use of tetraethylurea in the production of hydrogen peroxide by an anthraquinone process.

SUMMARY OF THE INVENTION (N,N-dialkyl)carboxylic acid amides have now been found to be superior solvents for the anthraquinones used in hydrogen peroxide production, particularly in admixtures with other solvents heretofore employed in the production of peroxide. The (N,N-dialkyl)carboxylic acid amides of this invention, hereinafter referred to as "amides," have the formula

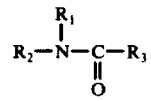

in which $R_1$, $R_2$ and $R_3$ are alkyl groups having one to eight carbon atoms, e.g., methyl ethyl, propyl, butyl, amyl, hexyl, heptyl, octyl, with the proviso that the solubility of the amide in water at 25° C. is less than 1 percent by weight. Most preferably, $R_1$ and $R_2$ are butyl and $R_3$ is ethyl. Mixtures of 1 to 50 percent by weight of the amide with 50 percent to 99 percent by weight of a hydrocarbon solvent, an alkylnaphthalene or an alkylbenzene or a mixture of alkylbenzene derivatives are preferred.

Quinones as well as hydroquinones, and particularly ethyl anthraquinone (EAQ) and tetrahydroethylanthraquinone (THEAQ) are readily soluble in the amides of this invention. Hydroquinone solubilities are three to five times greater than in systems employing diisobutyl carbinol, for example, the latter being a solvent now employed in hydrogen peroxide manufacture. When the amides of this invention are employed, particularly with EAQ and THEAQ, recovery of hydrogen peroxide is high and no unusual extraction problems are encountered. Thus, the solvents of this invention permit more efficient hydrogen peroxide production in any anthraquinone process using existing equipment.

DETAILED DESCRIPTION OF THE INVENTION

The amide solvents of this invention are easily prepared by the reaction of an acid chloride and a secondary amine according to the equation:

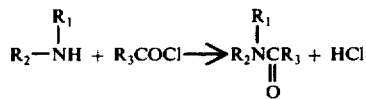

Since $R_1$ and $R_2$ can be varied independently, a large number of operable amides within the scope of the instant concept can be easily prepared and several are available commercially. The most preferred amide of this invention is N,N-di-n-butyl-propionamide, hereinafter referred to as DBP. This solvent is a liquid which is immiscible with water; it has a boiling point of 260° C. and a density of 0.88. Anthraquinones generally are highly soluble in DBP.

Any other amide solvent which has a solubility in water of less than 1 percent by weight at 25° C. within the scope of the above formula is similarly advantageously employed as a solvent for the anthraquinones commonly used in hydrogen peroxide production. Some other such suitable solvents include, for example, N,N-dimethylbutyramide,
N,N-diisopropylacetamide,
N-pivaloylpiperidine,
N,N-diethylcyclohexane carboxylic acid amide,
N,N-diethylbutyramide,
N,N-dimethylvaleramide,
N,N-diisopropylacetamide,
N,N-di-s-butyl-2-ethylbutyramide,
N,N-dicyclohexylisovaleramide,
N,N-dioctylpivalamide,
N-butyl-N-methylisobutyramide,
N-cyclohexyl-N-ethyl-2-ethylhexanoic acid amide,
N-methyl-N-octyloctanoamide,
N,N-diisopentylcyclohexanecarboxylic acid amide and the like.

Any of the anthraquinone starting materials used in the production of hydrogen peroxide are highly soluble in the amides of this invention either in the quinone or hydroquinone form. Thus, the amides of this invention may be used alone as the solvent in the production of peroxide although it is preferred to use them in admixture with other solvents heretofore employed in the production of hydrogen peroxide. It has been found, for example, that when the amides of this invention are substituted for the diisobutyl carbinol generally employed in the conjunction with a hydrocarbon solvent in the preparation of hydrogen peroxide, hydroquinone solubilities increase by 300 to 500 percent. Accordingly, mixtures containing from 1 to 50 percent of the amides of this invention and hydrocarbons, preferably having one to ten carbon atoms have been found to give improved results. Likewise, mixtures of 1 to 50 percent of the amides of this invention and alkylnaphthalenes preferably having one to five carbon atoms in the alkyl group; alkylbenzenes, preferably having one to five carbon atoms in the alkyl group or a mixture of alkyl benzenes such as, for example, the Hi-Sols are preferably employed. The Hi-Sols are mixtures of alkylbenzene derivatives of which about 90 percent contain $C_3$ to $C_5$ alkyl groups. The di-, and tri- and tetraalkylbenzene mixtures have boiling points above 170° C., generally 180° C. to 230° C. Thus, any of the solvents disclosed, for example, in U.S. Pat. Nos. 3,699,217, issued to Schreyer et al. on Oct. 17, 1972; 3,328,128 issued to Kabish on June 27, 1967; 3,038,786 issued to Hiratsuka et al. on June 12, 1962; 2,537,655 issued to Dawsey et al. on Jan. 9, 1951; 2,668,753 issued to Harris et al. on Feb. 9, 1954, 2,215,883 issued to Riedl et al. on Sept. 24, 1940; 2,689,169 issued to Hinegardner on Sept. 14, 1954 and the like may be used in conjunction with the amides of this invention if desired. It is particularly preferred to use a monomethyl or dimethylnaphthalene or an alkylbenzene derivative if a second solvent is desired for the quinone.

The amides of this invention are considered particularly important for use with 2-ethylanthraquinone and tetrahydro-2-ethylanthraquinone since 2-ethylanthraquinone is the least expensive anthraquinone commonly used in the production of peroxide. Nevertheless, the use of these anthraquinones has been limited due to their relatively low solubility as well as the low solubility of the corresponding hydroquinones in the solvents commonly used in peroxide manufacture. As a consequence, the more readily soluble albeit more expensive anthraquinones are more frequently used. However, 2-ethylanthraquinone and the corresponding hydroquinone are at least twice as soluble in the amides of this invention as in other conventionally employed solvents or solvent systems used in peroxide manufacture. Notwithstanding, the other anthraquinones used in the production of hydrogen peroxide are also highly soluble in the amides of this invention and any of them can be used with the amides disclosed herein including, for example, 2-ethyl-, 2-isopropyl-, 2-tert-butyl-, 2-amyl-, 1,3-dimethyl-, 2,3-dimethylanthraquinone and any of those listed in any of the patents cited herein. Thus, the amides of this invention can be used with advantage in any anthraquinone process for producing hydrogen peroxide such as, for example, any of those disclosed in any of the patents cited herein.

The invention is further illustrated but is not intended to be limited by the following examples in which all parts and percentages are by weight unless otherwise specified.

EXAMPLE 1

The solubility of ethylanthrahydroquinone (EAHQ) and tetrahydroethylanthrahydroquinone (THEAHQ) was measured in various ratios of Hi-Sol (a mixture of alkylbenzene derivatives having a boiling point of 180° C. to 230° C. and of which about 90 percent contain $C_3$ to $C_5$ alkyl groups) and N,N-di-n-butylpropionamide (DBP) and hydrogen peroxide yields were determined in each case as outlined in TABLE I. The solubility of the hydroquinone was determined by dissolving a weighed quantity of the quinone in 10 ml. of the solvent mixture. After addition of 0.6 percent $Pd/Al_2O_3$ catalyst to each solution, the mixture was hydrogenated until hydrogen uptake ceased.

If hydroquinone precipitated, sufficient diethyl ether was added to dissolve it. The mixture was then filtered and the ether removed under high vaccum. The mixture was then stirred and warmed until complete solution occurred.

If no hydroquinone precipitated during hydrogenation, the mixture was filtered without addition of the ether. It was then cooled until precipitation occured. The mixture was then allowed to warm until solution occurred.

For comparative purposes, TABLE II lists 2-ethylanthrahydroquinone solubilities in various solvents as reported in the patents listed in the table.

TABLE I

Hydroquinone Solubilities in Hi-Sol/DBP

| Parent Quinone | Concentration (g./liter) | Solvent Ratio (Volume) | Solution Temperature | $H_2O_2$ Yield (%) |
|---|---|---|---|---|
| EAQ | 91.5 | 80/20 | −18° | 89 |
| EAQ | 130.2 | 80/20 | >100° | 79 |
| EAQ | 132.0 | 70/30 | −18° | 90 |
| EAQ | 162.8 | 70/30 | >100° | 91 |
| THEAQ | 89.8 | 80/20 | −15° | 92 |
| THEAQ | 128.5 | 70/30 | −20° | 96 |
| THEAQ | 165.4 | 70/30 | >99° | 87 |

TABLE II

2-Ethylanthrahydroquinone Solubility

| Patent | Solvent | Solubility at 30° C. (g./liter) |
|---|---|---|
| 3,328,128 | 75% trimethylbenzene 25% trioctylphosphate | 62.0 |
| " | 50% trimethylbenzene 50% diisobutylcarbinol | 42.0 |
| " | 50% trimethylbenzene 50% methylcyclohexyl acetate | 45.0 |
| 3,038,786 | 50% xylene 50% diisobutylcarbinol | 26.0 |
| " | 100% diisobutylcarbinol | 48.0 |
| 2,668,753 | 40% benzene 60% diisobutylcarbinol | 35.0 |
| " | 40% α-methylnaphthalene 60% diisobutylcarbinol | 52.0 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. In a process for the production of hydrogen peroxide by the reduction and oxidation of an anthraquinone, the improvement which comprises carrying out the reduction and oxidation while the anthraquinone is dissolved in an (N,N-dialkyl)carboxylic acid amide having a solubility in water of less than 1 percent at 25° C.

2. The improvement of claim 1 wherein the anthraquinone is dissolved in a mixture of from 1 to 50 percent by weight of an (N,N-dialkyl)carboxylic acid amide and 50 to 99 percent of a second solvent used in peroxide manufacture.

3. The improvement of claim 2 wherein the second solvent is a hydrocarbon, an alkylnaphthalene, an alkylbenzene or a mixture of alkylbenzene derivatives.

4. The improvement of claim 3 wherein the second solvent is monomethyl naphthalene, dimethyl naphthalene or Hi-Sol.

5. The improvement of claim 1 in which the (N,N-dialkyl) carboxylic acid amide has the formula

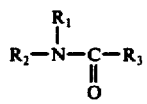

wherein $R_1$, $R_2$ and $R_3$ are alkyl groups having one to eight carbon atoms.

6. The improvement of claim 5 wherein $R_1$ and $R_2$ are n-butyl and $R_3$ is ethyl.

7. The improvement of claim 1 wherein the anthraquinone is 2-ethylanthraquinone.

8. The improvement of claim 1 wherein the anthraquinone is tetrahydro-2-ethylanthraquinone.

9. The improvement of claim 1 wherein the anthraquinone is 2-tert-butylanthraquinone or tetrahydro-2-tert-butylanthraquinone.

10. The improvement of claim 1 wherein the anthraquinone is 2-amylanthraquinone or tetrahydro-2-amylanthraquinone.

* * * * *